Nov. 4, 1952  H. E. SWANSON  2,616,528
BRAKE SHOE WITH REMOVABLE LINING
Original Filed March 18, 1948
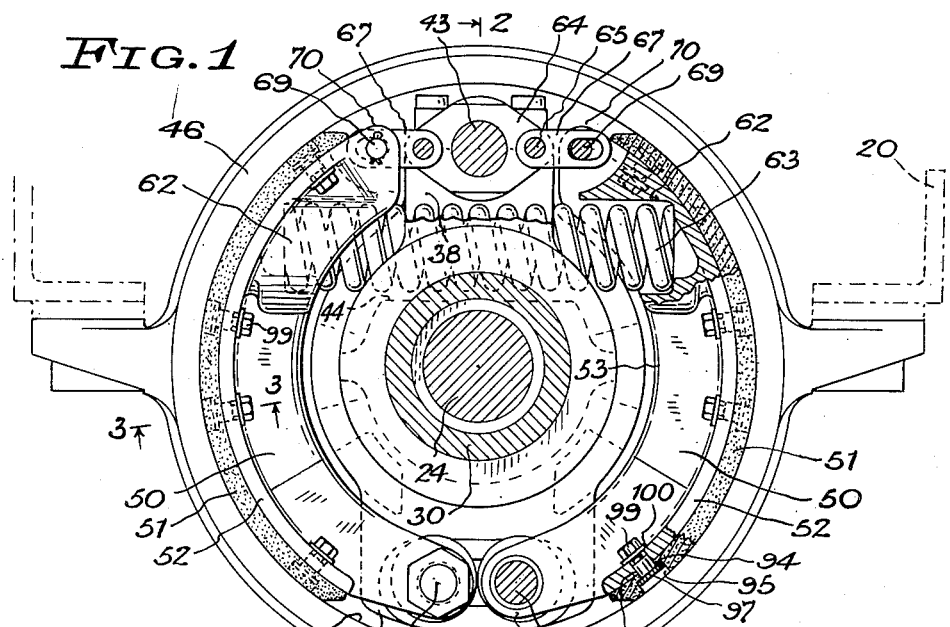
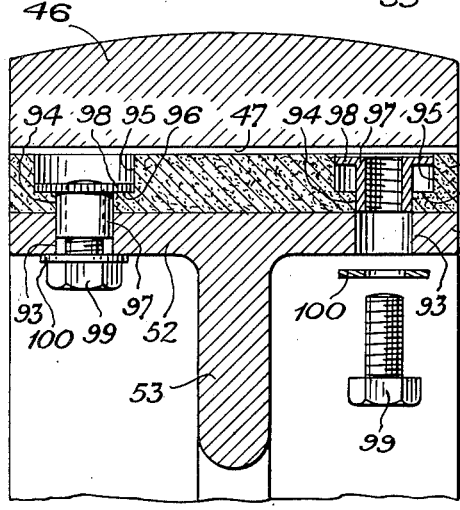
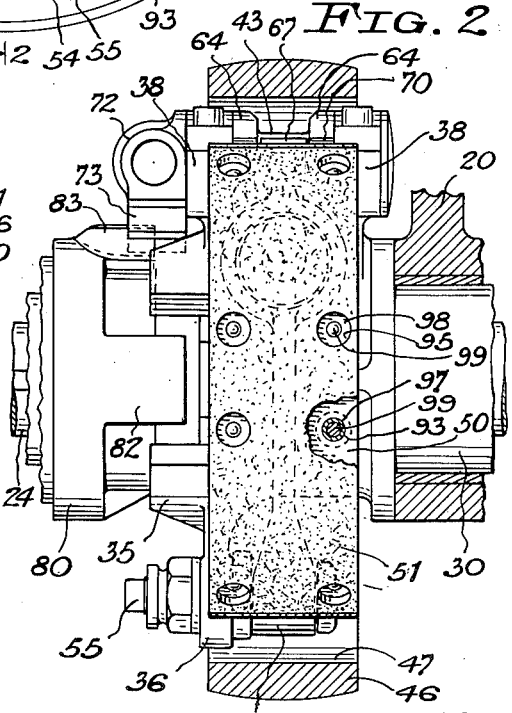
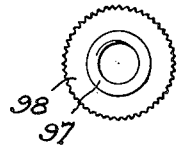
INVENTOR
HILBERT E. SWANSON
BY Christopher L. Waal
ATTORNEY Patented Nov. 4, 1952

2,616,528

UNITED STATES PATENT OFFICE 2,616,528

BRAKE SHOE WITH REMOVABLE LINING

Hilbert E. Swanson, Milwaukee, Wis., assignor to Unit Crane & Shovel Corp., West Allis, Wis., a corporation of Delaware Original application March 18, 1948, Serial No. 15,680. Divided and this application July 2, 1949, Serial No. 102,807

4 Claims. (Cl. 188—234)

1

The present invention relates to friction devices, and more particularly to lined brake shoes and the like, this application constituting a division of my copending application for Brake Construction, Serial No. 15,680, filed March 18, 1948.

An object of the invention is to provide improved means for firmly securing a friction lining on a brake shoe or other support, and which is so arranged as to facilitate replacement of the lining and to avoid dismantling of associated mechanism when effecting such replacement.

Another object is to provide securing means of this character which is applicable to a lining of uniform thickness and which will minimize weakening of the lining.

The invention further consists in the several features hereinafter described and claimed.

In the accompanying drawing,

Fig. 1 is a transverse sectional view of a brake unit embodying the invention;

Fig. 2 is a side view of the brake unit, a nonrotatable brake drum and frame being shown in section on the line 2—2 of Fig. 1, and parts of a rotatable portion of the brake unit being broken away and parts being shown in section;

Fig. 3 is a detail sectional view of a brake shoe and cooperating brake drum, taken generally on the line 3—3 of Fig. 1, and showing one of the lining-securing devices in released position, and Fig. 4 is a detail view of a lining-securing nut.

The brake of the invention is adapted for use in various machines, but by way of example is shown and described as incorporated in a braking and driving unit for a crawler-type power shovel or crane, such as that disclosed in the above-mentioned application Serial No. 15,680, and in United States Patent 2,318,286 to Brey and Swanson for Traction Brake, issued May 4, 1943.

The machine includes a frame 20 rigidly carrying a non-rotatable brake drum 46 of the braking and driving unit, there being one of these units for each crawler. A suitably journalled horizontal drive shaft 24 extends axially through the brake drum, and a driven sleeve 30 is rotatably mounted on the drive shaft and is journalled in the frame 20. As in the above application and patent the driven sleeve has a chain drive connection, not shown, with the crawler. The sleeve 30 is provided at one end with clutch jaws 35, and an axially slidable clutch member 80 has jaws 82 cooperating with the sleeve jaws 35 to drive the sleeve, as in the above application and patent. At one side and adjacent the jaws 35,

2 the sleeve has a slotted brake-mounting ear or flange 36, and at the opposite side the sleeve has axially spaced ears 38 in which is journalled a brake-releasing member 43.

Cooperating with the brake drum 46 are two opposed metallic brake shoes 50 of approximately semi-circular shape carrying respective arcuate friction linings or brake blocks 51 which are secured in place as hereinafter described and are adapted to engage the inner cylindrical surface 47 of the brake drum. The friction linings are here shown to be of a conventional type. The brake shoes are of identical construction, each having an arcuate head or band portion 52 and an inner radial reinforcing flange 53, the intermediate portion of the shoe having a generally T-shaped cross section as seen in Fig. 3. The arcuate band portion 54 has a cylindrically curved outer face which extends to the opposite side edges of the band portion. At one end, each shoe has a bushed eye 54 pivotally carried on one of a pair of mounting bolts 55 which extend through and are secured to the slotted ear 36 of the sleeve 30 and are parallel to the axis of the drive shaft 24, the adjacent end of the other shoe being similarly carried on the second mounting bolt 55. The mounting bolts 55 are rigidly but adjustably secured to the slotted ear 36.

Near their other ends the brake shoes have aligned sockets 62 receiving the opposite ends of a compressed coiled spring 63 extending transversely of the drive shaft 24 and disposed in a chamber 44 formed transversely in the sleeve 30, the spring serving to urge the brake shoes against the brake drum 46 and thus hold the driven sleeve 30 against rotation.

The brake-releasing member 43 comprises a rock shaft having opposed pairs of arms 64 which are connected by link blocks 67 with laterally spaced terminal ears 70 on the respective brake shoes, the link blocks being secured at opposite ends by pivot pins 65 and 69. The link blocks laterally confine the brake shoes and are longitudinally slotted at their outer ends, thus forming lost motion connections with the brake shoes. The rock shaft is suitably actuated in either direction to release the brake shoes, as by providing it with a transversely apertured head 72, Fig. 2, having a sector gear 73 meshing with gear teeth 83 formed on the rotatable and axially shiftable clutch member 80. A sufficient angular lost motion is provided between the clutch jaws 82 and 35 to permit release of the brake shoes before driving power is applied to the driven sleeve 30.

Replacement of conventionally secured brake linings in the type of machine disclosed in the above Patent 2,318,286 has heretofore necessitated considerable dismantling of the mechanism, and one of the purposes of the present invention is to facilitate the replacement of such linings. Each brake shoe 50 has formed through its band portion 52 a number of radial bores 93, there being a series of these bores near each side of the band. The lining 51 is provided with radial bores 94 of the same diameter as the brake shoe bores and registering therewith, the outer end of each lining bore 94 having a cylindrical counterbore 95 forming an annular seat 96. A cylindrical nut 97 of brass or other soft metal fits snugly in each lining bore 94 and in the associated shoe bore 93 and has an annular disk-like clamping flange 98 at its outer end non-rotatably fitting in the counterbore 95 and engaging the seat 96, the edge of the flange being preferably serrated or milled, as seen in Fig. 4, to engage the walls of the counterbore. The axial dimension of the nut is not substantially greater than the normal thickness of the lining and preferably slightly shorter. The nut is held firmly in clamping position by a cap screw 99, preferably of brass or other soft metal, the screw head bearing on a washer 100 engaging the inner side of the brake shoe band 52, as seen in the left-hand part of Fig. 3. The nuts 97, fitting snugly in the bores 93 and 94, resist lateral shifting of the linings in all directions. The bores in the lining do not appreciably weaken the lining.

When the linings of each brake unit become so worn as to require replacement, the brake shoes are released from the brake drum, as by means of a suitable pry bar or other tool, not shown, engaging the apertured head 72 of rockshaft 43. The screws 99 on each brake shoe are then loosened and while still engaged in the nuts 97 are tapped to drive the associated nuts outwardly to the position shown at the right-hand portion of Fig. 3, the inner end of the nut clearing the outer face of the brake shoe. The screws are then detached, and with all the nuts in the position shown in the right-hand portion of Fig. 3 the lining is removed by sliding it laterally off the shoe at the side toward the clutch member 80. A new lining, with the nuts inserted to lie approximately flush with the linings, is installed by slipping it in the space between the drum and the brake shoe, and then pulling the nuts into the brake shoe bores 93 by screwing the cap screw 99 firmly into the nuts. When installing new linings the mounting bolts 55 for the brake shoes are adjusted to permit insertion of the linings and to effect proper adjustment of the linings with respect to the drum. After lining wear occurs the mounting bolts may require readjustment.

It will be seen that the brake linings are firmly held on the brake shoes, but can be easily and quickly replaced when they become worn. Furthermore, it is not necessary to dismantle the mechanism when replacing the linings.

What I claim as new and desire to secure by letters patent is:

1. In a friction device, a support having a face extending unobstructedly to an outer side of the support, a friction lining carried on said support face and having transverse bores therethrough each with a counterbore at the friction side, said support having bores aligned with said lining bores, nut members fitting in said aligned bores of said support and lining to resist relative lateral displacement of said lining with respect to said support and each having a head seated in the associated counterbore and non-rotatively engaging the side walls of said counterbore, said nut members each having an axial dimension not substantially greater than the normal thickness of said lining, and screws extending in said support bores and detachably threaded into said nut members for drawing said nut members into said support bores and for clamping said lining to said support, said nut members being retractable from said support bores into said lining, and said lining after detachment of said screws from said nut members and retraction of said nut members into said lining being laterally withdrawable from and along said support.

2. In a friction device, a support having a face extending unobstructedly to an outer side of said support, a friction lining carried on said support face and having transverse bores therethrough each with a cylindrical counterbore at the friction side, said support having bores aligned with said lining bores, nut members fitting in said aligned bores of said support and lining to resist relative lateral displacement of said lining with respect to said support and each having a peripherally serrated head seated in the associated counterbore and non-rotatively engaging the side walls of said counterbore, said nut members each having an axial dimension not substantially greater than the normal thickness of said lining, and screws extending in said support bores and detachably threaded into said nut members for clamping said lining to said support, said nut members being retractable from said support bores into said lining from said support bores.

3. In a friction device, a support having openings and having a face to which said openings extend, said face extending unobstructedly to an outer side edge of said support, a replaceable friction lining carried by said support face and having transverse openings therethrough aligned with said support openings, each lining opening having an enlarged end at the friction side of said lining, headed nuts fitting in the aligned openings of said lining and support to resist relative lateral shifting of the lining with respect to said support and having an axial dimension not substantially greater than the normal thickness of said lining, the head portion of each nut being disposed in the enlarged end of the associated lining opening, and screws extending in said support openings and detachably engaged in the associated nuts for drawing said nuts into said support openings and for clamping the lining to said support, said nuts being axially retractable from said support openings into said lining, and said lining after detachment of said screws from said nuts and retraction of said nuts into said lining being laterally withdrawable from and along said support face.

4. In a friction device, a support having a cylindrically curved face and having openings extending to said face, said face extending unobstructedly to an outer side edge of said support, a correspondingly curved laterally replaceable friction lining abutting against said face and having openings registering with said support openings, screw-threaded fastening members in said lining openings and having an axial dimension not substantially greater than the normal thickness of said lining, said fastening members being axially shiftable to enter said support openings and to be retracted therefrom into the lining, and complementary screw-threaded fastening members in said support openings interengageable with said first-named fastening members for drawing said first-named fastening members into said support openings and for releasably clamping said lining to said support; said lining, after detachment of said complementary fastening members from said first-named fastening members and retraction of said first-named fastening members into said lining, being laterally withdrawable from and along said support face.

HILBERT E. SWANSON.

REFERENCES CITED

The following references are of record in the file of this patent:

UNITED STATES PATENTS

| Number | Name | Date |
|---|---|---|
| Re. 20,485 | MacLean | Aug. 24, 1937 |
| 1,566,704 | Stevens | Dec. 22, 1925 |
| 1,671,759 | Bendix | May 29, 1928 |
| 1,789,133 | Bluhm | Jan. 13, 1931 |
| 2,328,738 | Nelson | Sept. 7, 1943 |